UNITED STATES PATENT OFFICE.

THOMAS ADAMS, OF HUDSON CITY, NEW JERSEY, ASSIGNOR TO JOHN D. ADAMS, OF SAME PLACE.

IMPROVEMENT IN CHEWING-GUM.

Specification forming part of Letters Patent No. 111,798, dated February 14, 1871.

*To all whom it may concern:*

Be it known that I, THOMAS ADAMS, of Hudson City, in the county of Hudson and State of New Jersey, have invented and made an Improvement in Chewing-Gum; and the following is declared to be a correct description thereof.

Chewing-gum has heretofore been made and used, especially by children, as a means for cleaning the teeth, hardening the gums, and sweetening the breath, by causing an increased flow of saliva. This chewing-gum is costly, and not always free from deleterious properties.

My invention consists in a method of preparing the natural product known as "chickly" to produce a chewing-gum.

The material known as chickly is a vegetable gum, the color of which varies from a dark cream to a brownish or earthy color. It is imported from Mexico, and possesses properties entirely different from either india-rubber or gutta-percha.

I take the crude gum, chickly of commerce, and subject the same to the action of hot water. This softens and melts the gum, so that it can be thoroughly washed in said hot water for the removal of coloring matter and impurities. I find it best to wash said gum in two or more hot-water baths, and any suitable stirrers or rollers may be employed for separating the softened gum sufficiently to bring the hot water into contact with all portions of the mass for the removal of all foreign matter. The plastic mass is then rolled or run into sheets or strips of suitable size, and cut up into pieces of the required size or shape.

The chewing-gum prepared in this manner is a new article of manufacture. It is free from odor or taste. It is light and compressible, and, when softened by the warmth of the mouth, becomes very tenacious and ductile, and can be stretched, broken, molded into form, and particles or pieces broken off can be instantly reunited. The saliva of the mouth does not dissolve the same; hence there is nothing of an unwholesome character.

I claim as my invention—

The chewing-gum prepared from the material and in the manner specified, as a new article of manufacture.

Signed by me this 11th day of January, 1871.

THOS. ADAMS.

Witnesses:
GEO. D. WALKER,
GEO. T. PINCKNEY.